United States Patent [19]

Fair

[11] 4,388,981
[45] Jun. 21, 1983

[54] VARIABLE CYLINDER HYDRAULIC VIBRATOR AND CONTROL SYSTEM

[75] Inventor: Delbert W. Fair, Ponca City, Okla.

[73] Assignee: Conoco Inc., Ponca City, Okla.

[21] Appl. No.: 289,958

[22] PCT Filed: Aug. 8, 1979

[86] PCT No.: PCT/US79/00592
§ 371 Date: Feb. 23, 1981
§ 102(e) Date: Feb. 23, 1981

[87] PCT Pub. No.: WO81/00461
PCT Pub. Date: Feb. 19, 1981

[51] Int. Cl.³ .............................................. G01V 1/14
[52] U.S. Cl. ........................................ 181/119; 91/39; 91/216 B; 91/266; 92/13.1; 92/13.6; 181/114; 181/120; 367/189
[58] Field of Search ...................... 181/114, 119, 120; 367/189; 91/39, 216 B, 266; 92/13.1, 13.6

[56] References Cited

U.S. PATENT DOCUMENTS

| 356,538 | 1/1887 | Hubner | 92/13.6 |
|---|---|---|---|
| 3,159,233 | 12/1964 | Clynch et al. | 181/119 |
| 3,168,853 | 2/1965 | Prince | 91/167 R |
| 3,369,459 | 2/1968 | Fisher | 91/39 |
| 3,482,646 | 12/1969 | Brown et al. | 181/120 |
| 4,106,586 | 8/1978 | Stafford | 181/121 |
| 4,147,228 | 4/1979 | Bouyoucous | 181/119 |

Primary Examiner—S. C. Buczinski
Attorney, Agent, or Firm—William J. Miller

[57] ABSTRACT

Apparatus for incremental cylinder length control in hydraulic seismic vibrators having increased frequency range. The vibrator apparatus (10) of the type having a reaction mass (38) and axial cylinder bore (42) utilizes hydraulically movable end sleeves (86 and 96) in each end of the cylinder bore (42) so that the end sleeves (86 and 96) can be controllably positioned thereby to alter the cylinder volume and adjust the hydraulic drive system (18) for maximum efficiency relative to operating frequency.

6 Claims, 2 Drawing Figures

VARIABLE CYLINDER HYDRAULIC VIBRATOR AND CONTROL SYSTEM

DESCRIPTION

BACKGROUND OF THE INVENTION

1. Field of the Invention

The invention relates generally to seimsic energy vibrators and, more particularly, but not by way of limitation, it relates to an improved vibration apparatus having selectively controllable drive cylinder volume for frequency range adaptability.

2. Description of the Prior Art

Prior art in point is U.S. Pat. No. 4,106,586 in the name of Stafford, property of the present assignee, which teaches a hydraulic siesmic vibrator wherein the reaction mass includes an axial drive cylinder that is variable between two positions, a maximum and a minimum cylinder volume. On the order of the present invention, the Stafford vibrator utilizes movable end sleeves disposed in opposite ends of the hydraulic cylinder and these, in turn, are hydraulically controllable between two positions, simultaneously, relative to the height of the cylinder. The present invention is directed to a continuously variable cylinder volume control and the capability of achieving optimum fluid compressibility factor throughout a selected frequency range of operation, and this is particularly desirable at higher seismic frequencies on the order of 250 Hertz and up.

SUMMARY OF THE INVENTION

The present invention contemplates a hydraulic seismic vibrator having a reaction mass driven on a double rod-end piston that is frame supported to couple selected frequency vibrational energy through a suitable baseplate for propagation of seismic energy within an earth medium. The double-rod-end piston is reciprocally disposed within an internal drive cylinder within the reaction mass, and hydraulic servo control provides controlled frequency alternating fluid under pressure to drive the reaction mass. Slidable end sleeves are disposed in opposite ends of the internal cylinder and hydraulically controllable either manually or in response to sweep control input for variation of their relative positions thereby to change the internal maximum length of the drive cylinder.

DETAILED DESCRIPTION

Figure 1:
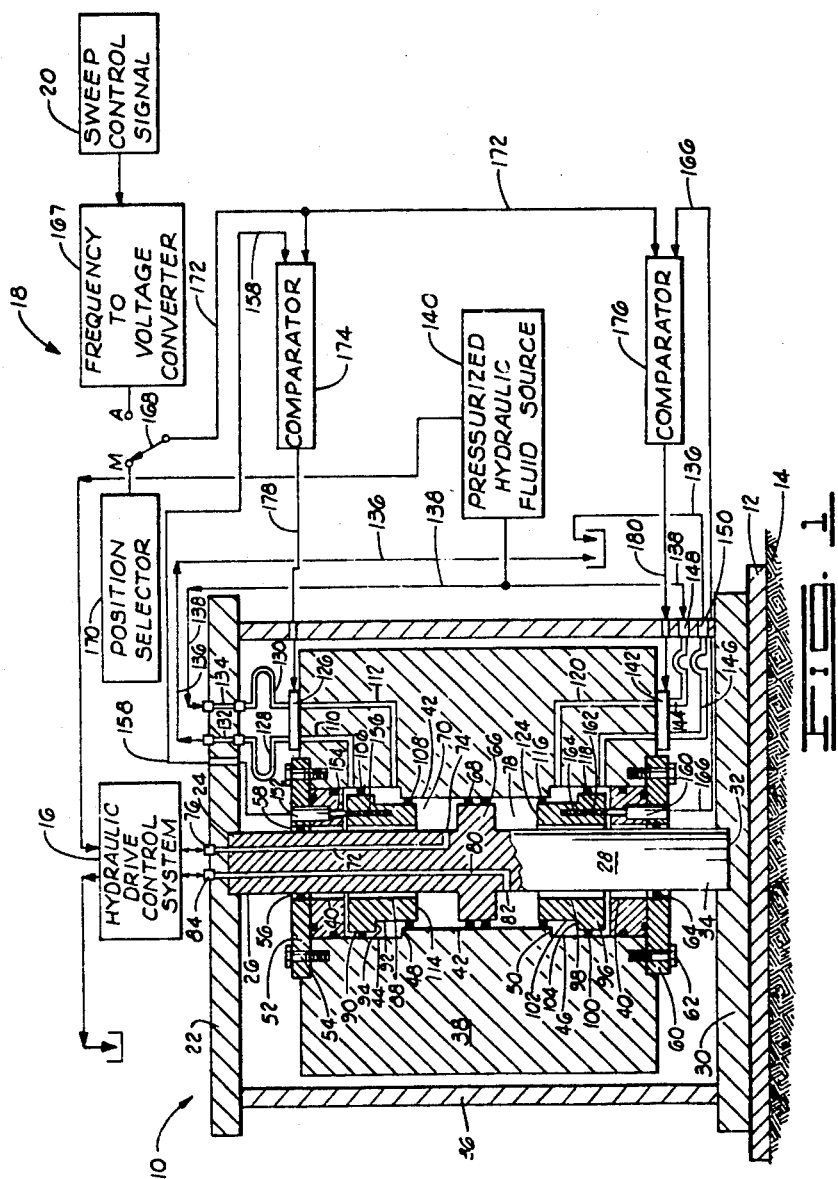
FIG. 1 is an idealized view in elevation, with parts in section, of a hydraulic vibrator constructed in accordance with the present invention, a control system being shown in block diagram.

FIG. 1 illustrates a compressional wave seismic vibrator 10 placed in energy coupling engagement by a baseplate 12 for propagation of energy into an earth medium 14. The vibrator 10 is controlled as to range and sweep frequency by a hydraulic drive control system 18. While not specifically shown, the basic sweep control signal generator for the vibrator system is well-known in the art, and in this case it provides input of sweep control signal 20 for the cylinder length control as well as the control signal input to hydraulic drive control system 16.

Referring to vibrator 10, a circular top plate 22 is rigidly secured at a center recess 24 to an upper end 26 of a double-rod-end piston 28. In normal practice, top plate 22 is secured to piston rod 26 by concentric bolting. In like manner, a circular lower plate 30 is bolt-secured at central recess 32 to receive a lower end 34 of double-rod-end piston 28. A cylindrical side wall 36 is then secured as by welding to enclose a reaction mass 38, the entire housing structure providing a rigid connection between upper and lower rod ends 26 and 34, respectively, to a selected baseplate 12 that provides energy coupling function in contact with earth surface 14.

The central axis of reaction mass 38 is then formed with a central bore 40 through which the double-rod-end piston 28 is received in sealed, reciprocable relationship. The bore 40 includes a larger diameter central portion forming a drive cylinder 42, an enlarged diameter upper cylinder 44, and another enlarged diameter lower cylinder 46. Thus, upper and lower cylinders 44 and 46 are characterized by upward and downward facing shoulders 48 and 50, respectively, as they are disposed on opposite ends of drive cylinder 42. The upper end of bore 40 is sealingly closed by an end cap 52 secured to reaction mass 38 by means of a plurality of concentric bolts, 54, and having a central opening 56 carrying annular seal 58 in contact around upper-rod-end 26. In like manner, the lower end of reaction mass 38 has an end cap 60 as secured by bolts 62 to maintain annular seal 64.

Thus, the double-rod-end piston 28 is sealingly received within reaction mass 38 and includes a central piston member 66 carrying a plurality of ring seals 68 in contact with the surface of drive cylinder 42. Hydraulic drive pressure is applied to upper portion 70 within cylinder 42 through the fluid passage 72 and port 74 as supplied from a top plate feedthrough connector 76 further connected to the servo valve (not specifically shown) within hydraulic control system 16. In usual construction, the servo valve is rigidly secured on or about vibrator 10. Fluid pressure to the lower portion 78 of drive cylinder 42 is supplied via passage 80 and port 82 from a similar feedthrough connector 84 and the servo valve.

The length of upper portion 70 of drive cylinder 42 is controlled by a movable end sleeve 86, a body of revolution having a central bore 88, a large diameter portion 90 and lesser diameter portion 92 as separated by a shoulder 94. Similarly, a lower end sleeve 96 has a central bore 98, for sealingly receiving lower rod-end 34, as well as a large diameter end 100 and lesser diameter end 102 as separated by seating shoulder 104.

Upper end sleeve 86 is adapted to be hydraulically driven between limits of end cylinder 44 and includes sealing rings 106 and 108 below respective fluid porting passages 110 and 112 so that the end sleeve 86 may be selectively or automatically positioned with its lower surface 114 defining the upper limit of volume portion 70 of drive cylinder 42. In like manner, and as controlled in synchronism, lower end sleeve 96 carries slidable seals 116 and 118 above respective fluid passages 120 and 122 as end sleeve 96 is controllably slidable to position top surface 124 at a selected lower limit for drive cylinder 42.

Fluid passage ways 110 and 112 are connected to a servo valve 126 which, in turn, is connected through flexible hose loops 128 and 130 and respective feedthrough connectors 132 and 134 to the hydraulic pressure supply lines 136 and 138 from pressurized hydraulic fluid source 140. Similarly, lower fluid control passages 120 and 122 are connected through a servo valve 142, flexible hose loops 144 and 146, and feedthrough connectors 148 and 150 to the fluid control lines 136 and 138. The servo valves 126 and 142 may be any of various commercially available types, e.g. Moog Type AO 76-104.

Position sensing feedback is carried out by linear velocity differential transformers, known as LVDT sensors. The position of both end sleeves 86 and 96 are continually sensed to provide a position signal output to associated comparators in control system 18, as will be further described. Thus, an LVDT 152 is suitably mounted through upper end plate 52 and a portion of reaction mass 38 to extend a sensing core 154 down within a bore 156 formed in upper end sleeve 86. Signal output from LVDT 152 is provided via lead 158 to provide position signal. In like manner, the position of lower end sleeve 96 is sensed by an LVDT 160 extending a sensing core 162 into a similarly formed bore 164. Output position signals are then provided by electrical lead 166. A suitable form of commercially available LVDT is the SCHAEVITZ LVDT, MODEL 1000.

The control system 18 may function either on manual or automatic control depending upon the setting of switch 168. Thus, in the manual position, position selector 170 may be set to provide manual control voltage through 168 to a lead 174 which supplies the reference voltage in parallel to each of the two comparators 174 and 176. The comparators may be described as position servo systems where a position feedback signal is compared against a reference position signal and provides an error or signal drive to the servo valve until the feedback signal is equal to the reference signal. A feedback position signal from LVDT 152 is supplied on lead 158 to the other input of comparator 174, while a similar feedback position signal from LVDT 160 is provided on lead 166 to the second input of comparator 176. Correction or error voltage output from each of the comparators 174 and 176 will then be present on respective leads 178 and 180, through suitable feedthroughs of side wall 36 to the respective cylinder length servo valves 126 and 142.

When in the automatic mode setting of switch 168, sweep control signal 20 is provided as input to a frequency to voltage converter 18 which then derives a reference voltage for conduction via switch 168 and lead 172 for input to the comparators 174 and 176. The comparators 174 and 176 will then derive a comparison voltage relative to the sweep control reference signal on lead 172 to provide error voltage output on respective leads 178 and 180 thereby to control cylinder length servo valve 126 and 142. The control system 18 may be constructed either as an a-c or a d-c system; that is, a d-c system may be provided wherein position selector 170 and/or converter 167 provide a d-c output reference voltage and, accordingly, the LVDT's 152 and 160 would be d-c type units providing d-c error voltage on the respective leads 158 and 166. All such circuitry is entirely conventional and a matter of choice of components. One may utilize a-c electronics to carry out the same control functions.

Figure 2:
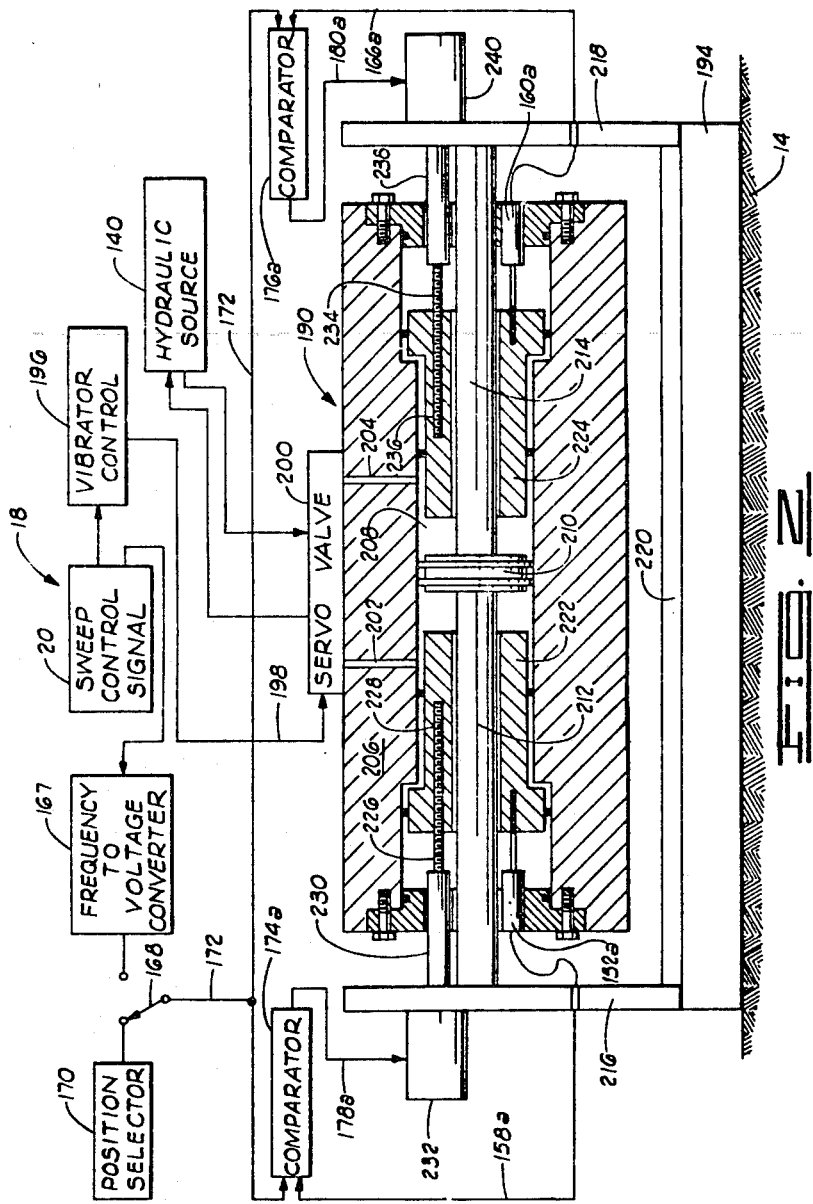
FIG. 2 is an idealized view in elevation, with parts shown in section of an alternative form of seismic vibrator and cylinder volume control.

FIG. 2 illustrates an alternative form of construction as a shear wave seismic vibrator 190 is operative through a baseplate 194 to couple seismic energy vibrations into earth medium 14. The vibrator 190 may utilize the same essential control system 18 to effect electromechanical control of the drive cylinder volume for shear wave vibrator 190. In the same manner as the FIG. 1 embodiment, vibrator excitation is effected by application of sweep control signal 20 through vibrator control circuitry 196 to provide control signal output on lead 198 to a servo valve 200. Servo valve 200 then tracks to selectively apply hydraulic fluid pressure from hydraulic source 140 through respective porting passages 202 and 204 formed within reaction mass 206 and in communication with opposite sides of a drive cylinder 208.

Vibrator 190 includes the reaction mass 206 as reciprocally disposed on a double-rod-end piston 210 having opposite ends 212 and 214 as are rigidly secured within end frames 216 and 218. In turn, the end frames 216 and 218 are rigidly secured to a base member 220 which is further secured to baseplate 194. Reaction mass 206 includes a central, axial bore similar to that of reaction mass 38 of FIG. 1, and controllably slidable end sleeves 222 and 224 are sealingly disposed for synchronized movements to control the internal length of drive cylinder 208. However, in this case the movement of end sleeves 222 and 224 is effected by means of a screw jack mechanism. Thus, end sleeve 222 may be reversably driven by a drive screw 226 within a threaded bore 228 receiving rotation from a shaft 230 and electrical motor 232 mounted on end frame 216. The opposite end sleeve 224 may be similarly moved by a drive screw 234 within threaded bore 236 as it receives rotation via shaft 238 from motor 240. In this case, comparators 174a and 176a would include power amplifier circuitry assuring adequate control power on control leads 178a and 180a to the respective drive motors 232 and 240.

In operation, and referring primarily to FIG. 1, the end sleeves 86 and 96 are each formed with a lesser diameter end that can be controllably moved into or out of drive cylinder 42 thereby to increase or decrease the cylinder length therein. The opposite ends of end sleeves 86 and 96 have a larger diameter, thus greater area, and as hydraulic fluid is ported through the large area end of control cylinders 44 and 46, respective end sleeves 86 and 96 will move into the drive cylinder 42 to decrease the cylinder length. This has the effect of increasing the fluid compressibility factor which is a desirable end in controlling the seismic vibrator 10 toward the higher frequencies, i.e. 250 Hertz and higher. Alternatively, and in accordance either with position selector 170 or sweep control signal 20, fluid porting to the lesser area end of the end sleeves 86 and 96 will cause the respective end sleeves to move out of the drive cylinder 42 allowing greater cylinder length as is desirable for the lower frequency vibrations. In this case, there is a decreasing compressibility factor and a lower fluid mass break frequency.

The position of the end sleeves 86 and 96 is continually sensed by the position sensors or LVDT 152 and 160, and the respective sensed position signals on leads 158 and 166 are fed to the respective comparators 174 and 176 along with a required position reference signal that is applied through switch 168, i.e. from either the manual position selector 170 or the automatic tracking signal as derived from sweep control signal generator 20 through frequency to voltage converter 167. The output error signal from each of comparators 174 and 176 is then fed via leads 178 and 180 to the respective control servo valves 126 and 142 which then port hydraulic fluid to the end sleeves 86 and 96 thereby to establish the required end sleeve position. Thus, it can be seen that the cylinder interval length can be set by manual selector 170 for a given frequency of operation, or the cylinder length can be controlled automatically to maintain a preselected high compressibility factor at all frequencies within the range of vibrator control signal frequencies as derived from sweep control signal generator 20. In the automatic mode, maximum energy coupling and efficiency is enabled as the end sleeve positioning is made to track with the vibrator control frequency sweep.

In FIG. 2, the same essential operation is effected albeit in the case of a shear wave vibrator 190, as selected for illustration. It is foreseen that it will be more difficult to operate the mechanical control system of vibrator 190 in an automatic mode or on a fast sweep frequency; however, it may be quite desirable for some field operations wherein many shots are made with a given frequency progression or range of frequencies, and periodic manual positioning of the electromechanical system will enable achieving of maximum energy coupling into the earth at the selected frequencies.

The foregoing discloses a novel form of variable cylinder length hydraulic vibrator and it is believed that changes may be made in the combination and arrangement of elements as heretofore set forth in the specification and shown in the drawings; it being understood that changes may be made in the embodiments disclosed without departing from the spirit and scope of the invention.

The embodiments of this invention in which an exclusive property or privilege is claimed are defined as follows:

1. Apparatus for incremental cylinder length control in a hydraulic vibrator of the type having a vibrating reaction mass with a cylinder bore disposed therein, comprising:
   first end sleeve means disposed in sealed, movable position in one end of said cylinder bore;
   second end sleeve means disposed in sealed, movable position in the other end of said cylinder bore and defining a cylinder of predetermined length between said end sleeve means;
   piston rod means sealed and slidably disposed through said first and second end sleeve means and including a piston disposed in said cylinder bore;
   hydraulic means for selectively positioning said first and second end sleeve means to adjust said cylinder bore length incrementally;
   sensor means disposed adjacent said end sleeve means to generate a sleeve position signal;
   control selection means generating a reference signal;
   means comparing said position and reference signal for generating an error signal for controlling said hydraulic means; and
   means for hydraulically actuating said piston for reciprocation within said cylinder thereby to impart vibration to said reaction mass.

2. Apparatus as set forth in claim 1 wherein said hydraulic means for selectively positioning comprises:
   first and second hydraulic servo valve means each communicating through said reaction mass to position respective ones of said first and second end sleeve means relative to said piston.

3. Apparatus as set forth in claim 2 wherein said sensor means, control selection means and means comparing comprise:
   first sensor means disposed proximate said first end sleeve means to generate a first sleeve position signal;
   second sensor means disposed proximate said second end sleeve means to generate a second sleeve position signal;
   control selection means generating a reference signal; and
   first and second comparator means each comparing respective first and second position signals to said reference signal to generate first and second error signals for connection to control said first and second hydraulic servo valve means.

4. Apparatus as set forth in claim 3 wherein said control selection means includes: means for enabling a selected voltage reference as a continuous selection signal.

5. Apparatus as set forth in claim 3 wherein said control selection means includes: means responsive to vibration frequency of said reaction mass for generating a selection signal wherein the voltage reference varies in proporation to said vibration frequency.

6. Apparatus as set forth in claim 1 wherein said means for selectively positioning comprises: first and second screw means disposed for threaded rotation in each of said first and second end sleeve means; first and second reversible motor means disposed proximate said reaction mass to provide rotational drive to said respective first and second screw means; and control means connected to provide energizing control to each of said first and second reversible motor means.

* * * * *